(12) United States Patent
Phaneuf

(10) Patent No.: US 8,339,267 B2
(45) Date of Patent: Dec. 25, 2012

(54) RFID DEVICE HAVING PROTECTIVE CAP ELEMENT AND METHOD OF MAKING

(75) Inventor: Peter C. Phaneuf, Grand Rapids, MI (US)

(73) Assignee: Avery Dennison Corporation, Pasadena, CA (US)

(*) Notice: Subject to any disclaimer, the term of this patent is extended or adjusted under 35 U.S.C. 154(b) by 312 days.

(21) Appl. No.: 12/238,508

(22) Filed: Sep. 26, 2008

(65) Prior Publication Data

US 2010/0079290 A1    Apr. 1, 2010

(51) Int. Cl.
*G08B 13/14* (2006.01)
(52) U.S. Cl. .................. 340/572.8; 340/572.7
(58) Field of Classification Search ............... 340/572.7, 340/572.5, 572.8; 257/678
See application file for complete search history.

(56) References Cited

U.S. PATENT DOCUMENTS

| 6,100,804 | A  | * | 8/2000 | Brady et al. | 340/572.7 |
| 6,114,962 | A  | * | 9/2000 | Wiklof et al. | 340/572.8 |
| 6,215,401 | B1 | * | 4/2001 | Brady et al. | 340/572.7 |
| 6,375,780 | B1 | * | 4/2002 | Tuttle et al. | 340/572.8 |

* cited by examiner

*Primary Examiner* — John A Tweel, Jr.
(74) *Attorney, Agent, or Firm* — Avery Dennison Corporation

(57) ABSTRACT

The present invention relates to a dynamic RFID device assembly which is able to withstand the additional stresses of using RFID devices in a non-planar arrangement. The invention includes the provision of a protective cap to prevent the fracturing or breakage of chip and antenna connection. The RFID device of the present invention can be included in a housing which may also be flexible thereby adding additional stability to the device.

23 Claims, 3 Drawing Sheets

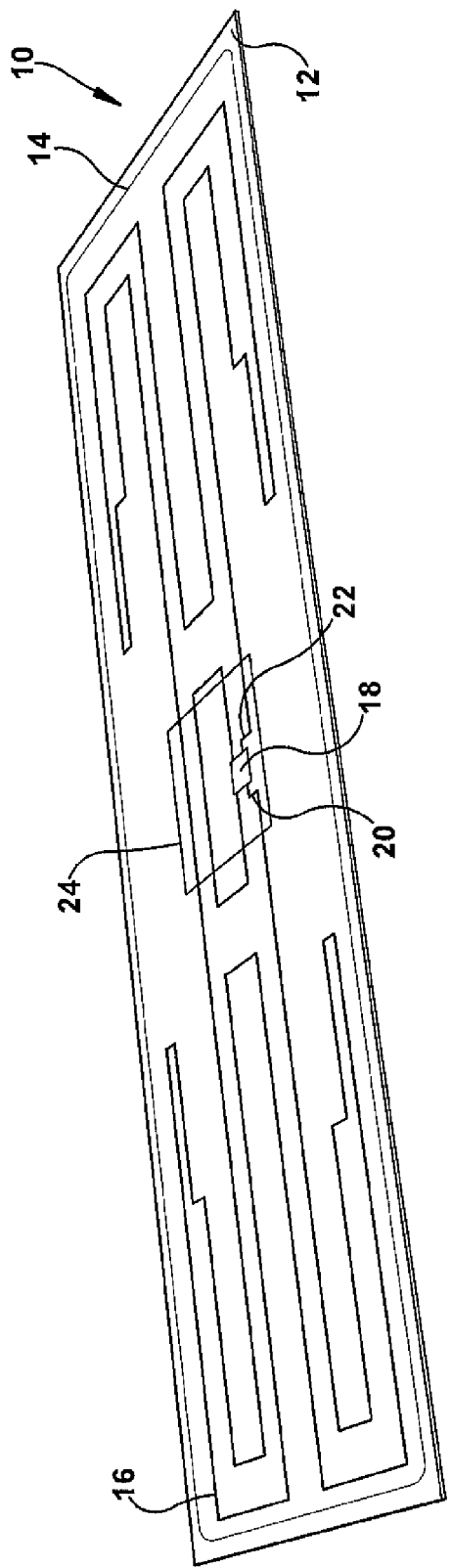
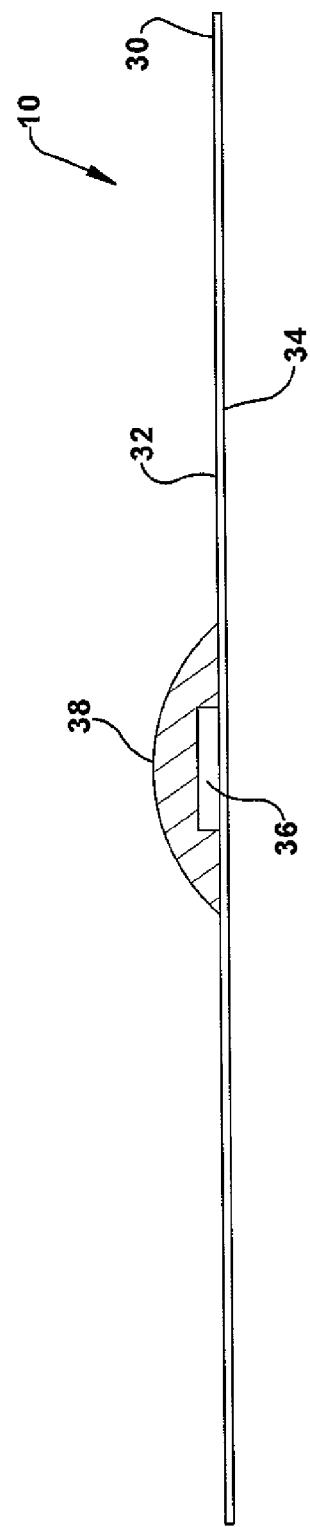
Fig. 1
Fig. 2

RFID DEVICE HAVING PROTECTIVE CAP ELEMENT AND METHOD OF MAKING

CROSS-REFERENCES TO RELATED APPLICATIONS

None.

FIELD OF THE INVENTION

The invention is in the field of radio frequency (RF) communication devices. More particularly, the present invention relates generally to radio frequency identification (RFID) devices and for creating RFID devices having a protective cap element that are suitable for use in non-planar environments in which RFID devices may be subjected to structural stress.

BACKGROUND OF THE INVENTION

Radio frequency identification (RFID) tags and labels (collectively referred to herein as "devices") are widely used to associate an object with an identification code or other information. RFID devices generally have a combination of antennas and analog and/or digital electronics, which may include for example communications electronics, data memory, and control logic. For example, RFID tags are used in conjunction with security locks in cars, for access control to buildings, and for tracking inventory and parcels.

As noted above, RFID devices are generally categorized as labels or tags. RFID labels are RFID devices that are adhesively or otherwise have a surface attached directly to objects. RFID tags, in contrast, are secured to objects by other means, for example by use of a plastic fastener, string or other fastening means.

RFID devices include active tags and labels, which include a power source for broadcasting signals, and passive tags and labels, which do not. In the case of passive devices, in order to retrieve the information from the chip, a "base station" or "reader" sends an excitation signal to the RFID tag or label. The excitation signal energizes the tag or label, and the RFID circuitry transmits the stored information back to the reader. The RFID reader receives and decodes the information from the RFID tag. In general, RFID tags can retain and communicate enough information to uniquely identify individuals, packages, inventory and the like. RFID tags and labels also can be characterized as to those to which information is written only once (although the information may be read repeatedly), and those to which information may be written to repeatedly during use. For example, RFID tags may store environmental data (that may be detected by an associated sensor), logistical histories, state data, etc.

RFID devices further can be characterized as passive, semi-passive, and active RFID devices. Passive RFID devices have no internal power supply. Power for operation of passive RFID devices is provided by the energy in an incoming radio frequency signal received by the device. Most passive RFID devices signal by backscattering the carrier wave from an RF reader. Passive RFID devices have the advantage of simplicity and long life, although performance of them may be limited.

There are at least two approaches to assembling RFID devices having IC chips with antennas and/or other electronic components. The IC chips are manufactured on a wafer and are typically delivered as a sawn wafer. The antennas which may be printed, etched or die cut are provided on a flexible web. In the first approach, manufacturers use precision pick-and-place machines to bond and electrically connect the bare IC chips directly to the other device components (e.g., antenna) without any intermediate connecting leads. These electronic components are placed into the substrate circuitry in a single process.

The second route of RFID assembly uses an intermediate connection lead instead of bonding bare dies directly onto the substrates. This is because as the chips become smaller, the process of interconnecting IC chips with antennas becomes more difficult. Thus, to interconnect the relatively small IC chips to the antennas in RFID inlays, intermediate structures variously referred to as "strap leads," "interposers," and "carriers" are sometimes used to facilitate inlay manufacture. The intermediate structures include conductive leads or pads that are electrically coupled to the contact pads of the chips for coupling the chips to the antennas. These leads provide a larger effective electrical contact area between the chips and the antenna than do the contact pads of the chip alone. With the use of the intermediate structures, the alignment between an antenna and a chip does not have to be as precise during the direct placement of the chip on the antenna as without the use of such strap leads.

Regardless of how the chip is attached to the antenna, either directly or through a strap, one issue that is encountered during the use of the RFID tag is when the label (i.e., substrate) is attached to a package and the label does not lie or remain on a completely flat surface. As the labels are bent, the die/antenna juncture is subject to stress and is prone to fracturing and breaking. In addition, the antenna may also be subject to bending and having its functionality compromised thereby. For example, the antenna may become detached from the substrate as the label bends. The same issues occur when the RFID tag is attached to an article that is subject to bending, such as an article of clothing or fabric material. Other bendable materials include sheets of plastic or metal. Moreover, the IC can be simply knocked off during the application of the RFID tag to the article or during subsequent processing such as during the step of printing the label.

Accordingly, there is a long-felt, but as yet unsatisfied need in the RFID device manufacturing field to be able to produce RFID devices that address the deficiencies noted above.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The RFID device of the present invention overcomes potential drawbacks of existing RFID devices in that a more dynamic structure is used to enable use of RFID devices in non-planar applications where structural stresses may be applied to the RFID device as opposed to those situations where the RFID device is simply provided on a flat surface.

In one exemplary embodiment of the presently described invention, an RFID device is provided and includes a substrate that has first and second surfaces. An antenna is applied to the first surface of the substrate and a chip is connected to the antenna on the first substrate. A protective cap is applied substantially over the chip and at least a portion of the antenna with the protective cap extending generally upwardly from the first surface of the substrate.

In another exemplary embodiment of the presently described invention an RFID device is described and includes a housing which has an exterior portion and an interior portion, with the interior portion having a cavity that has a first dimension. An RFID inlay is disposed within the cavity and the inlay has a second dimension that is less than the first dimension. The RFID inlay includes a substrate that has first and second surfaces. An antenna is provided on the first surface and a chip is connected to the antenna on the first surface. A protective covering is provided substantially over the chip and at least a portion of the antenna.

In a still further exemplary embodiment of the presently described invention a method of making an RFID device is described and includes the steps of initially providing an RFID inlay with the RFID inlay including a substrate that has first and second surfaces with an antenna applied to the first surface and a chip connected to the antenna. Next, the chip and a portion of the antenna is covered with a protective cover. Then, a housing is prepared that has an exterior portion and an interior with the interior portion defining a cavity prior to the step of providing an RFID inlay. The RFID inlay is positioned within the cavity of the housing and the housing is sealed around the inlay.

These and other objects of the invention will become clear from an inspection of the detailed description of the invention and from the appended claims.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which:

FIG. 1 is a perspective view of an RFID inlay showing a protective covering over the chip.

FIG. 2 is a side elevation of an RFID inlay showing the protective cap extending generally upwardly.

DETAILED DESCRIPTION OF THE INVENTION

Figure 3:
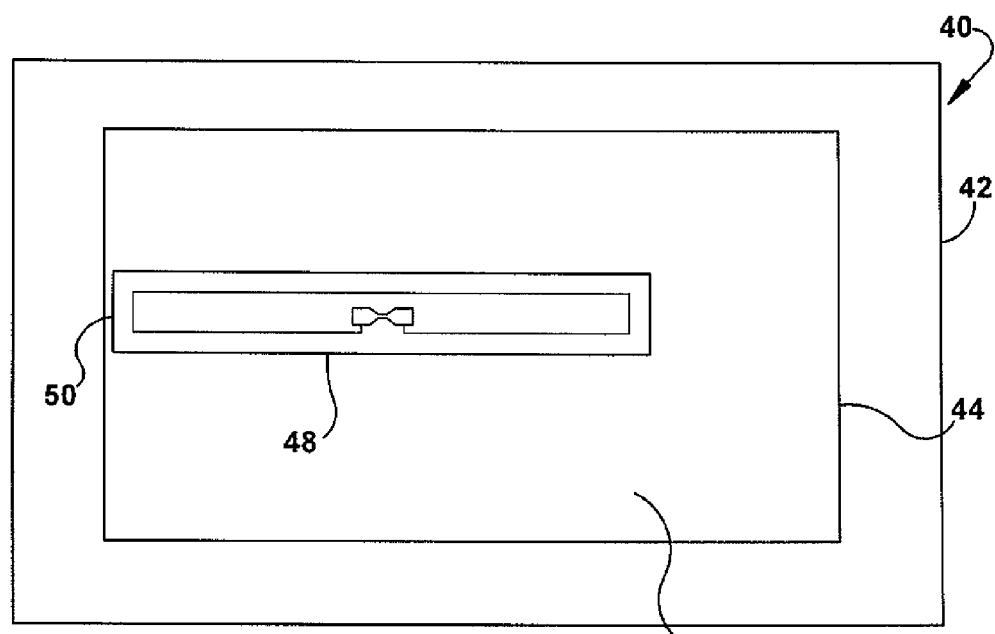
FIG. 3 is a prospective view of a housing containing a cavity in which an RFID inlay has been positioned.

The present invention is now illustrated in greater detail by way of the following detailed description which represents the best presently known mode of carrying out the invention. However, it should be understood that this description is not to be used to limit the present invention, but rather, is provided for the purpose of illustrating the general features of the invention.

Reference is now directed to FIG. 1 which shows an RFID inlay, generally designated by reference numeral 10. The inlay 10 is provided on a substrate 12 that has a first surface 14 and a second surface (not shown). On the first surface 14 is an antenna 16. The antenna may be prepared by printing conductive ink, etching metal or die cutting a conductive material, such as foil, in the desired pattern for the antenna. A chip or an integrated circuit 18 is attached to the antenna 16 typically through the use of adhesive. Alternatively, conductive leads 20 and 22 can be provided to facilitate the placement of the chip 18 on the antenna 16. A protective cap or covering 24 is provided over the chip and at least a portion of the antenna 16.

The protective covering 24 may also cover a portion of the antenna 16 and conductive leads 20 and 22 if provided. The conductive leads along with the chip are also known as a strap assembly. The protective covering or cap 18 shown in FIG. 1 is illustrated as a relatively quadrate structure, but may take any other regular geometric shape such as a circle, oval, square, rectangle, etc. or any other irregular shape that may be created. The material suitable for use in the protective cap may be selected from suitably flexible materials such as polyethylene, polyurethane and other plastic and rubber like materials.

Turning now to FIG. 2, a side elevation of an RFID inlay 10 is provided having a substrate 30 with first and second surfaces 32 and 34, respectively. The substrate is preferably a polymeric material such as a polyethylene based film, but other materials may be suitable including paper. Disposed on the first surface 32 of the substrate 30 is the chip 36 which is covered by a protective cap or covering 38. As can be seen from FIG. 2, the protective cap extends generally upwardly from the first surface of the substrate.

FIG. 3 presents a housing generally depicted by reference to numeral 40 having an exterior portion 42 and an interior portion 44 that defines a cavity 46. The cavity 46 has a first dimension and an inlay 48 has a second dimension that is preferably less than the first dimension. As shown in FIG. 3, the inlay 48 is attached along an end edge 50 to the interior portion 44 of the housing 40. The inlay 48 can be attached at any portion of the interior portion 44 of the housing 40 or may simply be free floating within the cavity 46. In addition, the cavity 46 can be filled with an inert gas, such as neon or helium, gel or liquid or alternatively, the air space created in the cavity may not have any components or elements added.

Figure 4:
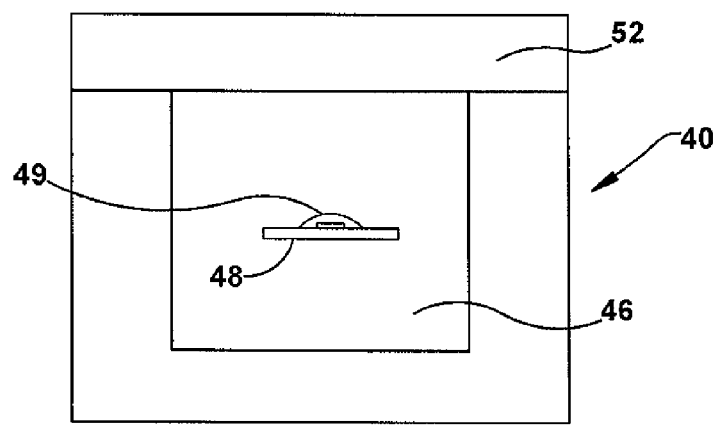
FIG. 4 shows a side elevation of a sealed housing with an RFID inlay provided therein.

FIG. 4 provides a cross section or cut away side view of the housing 40 with the inlay 48 shown floating in the cavity 46. The inlay 48 is also shown with the protective cap 49. In addition, in FIG. 4, the housing 40 is sealed through use of a cover 52 to prevent damage occurring to the inlay.

The housing 40 depicted in FIGS. 3 and 4 may be made of any suitable material and may be rigid or flexible depending on the application that will use the housing.

Figure 5:
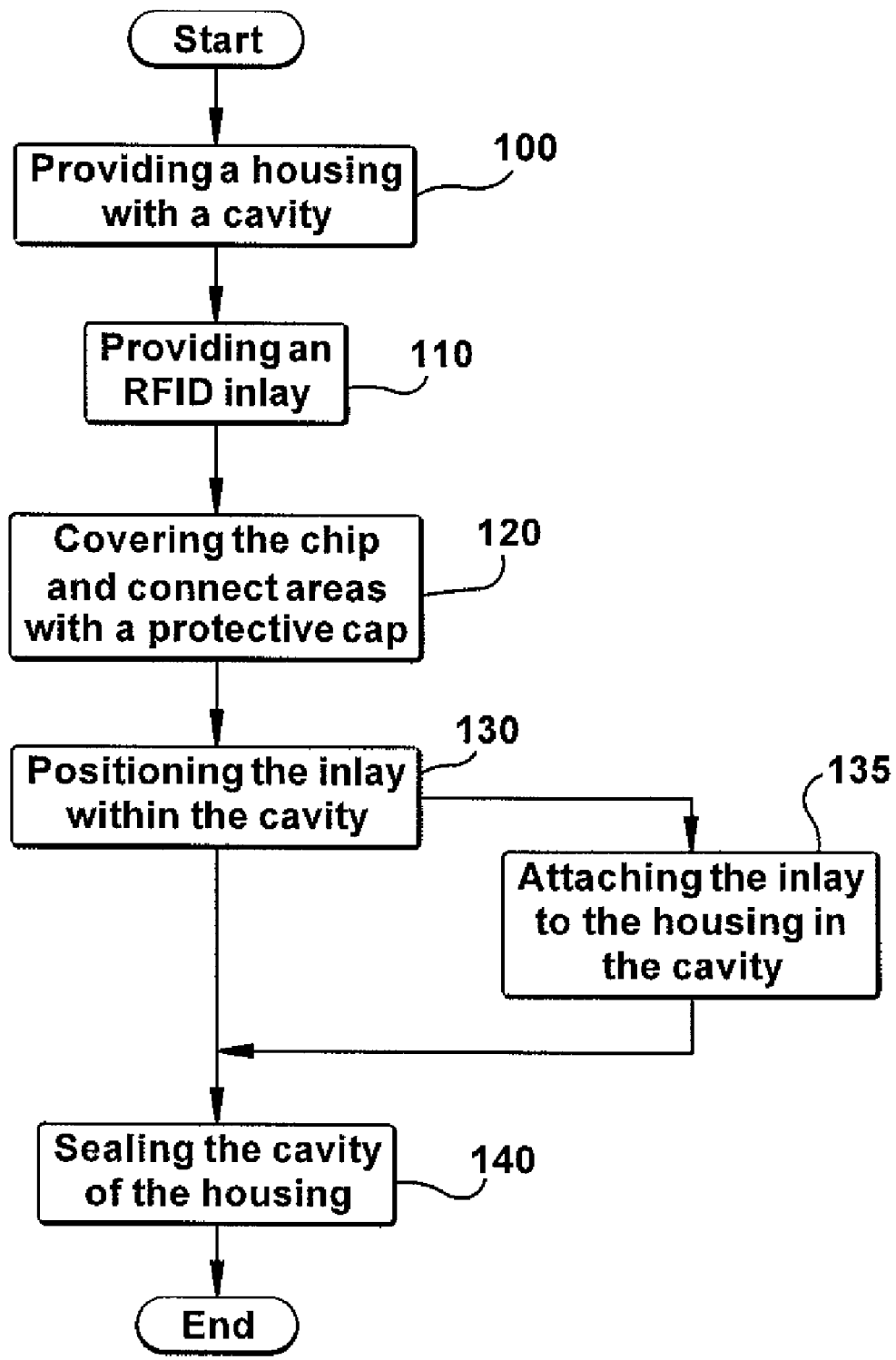
FIG. 5 provides a block diagram setting forth an exemplary method for practicing the presently described invention.

Reference is now directed to FIG. 5 in which a block diagram showing an exemplary method for practicing the present invention is illustrated. The process is started such as by providing a housing with a cavity at step 100. The housing itself will have an external portion making up the exterior of the housing and an interior portion that defines a cavity. The cavity will have a first dimension.

Next, at step 110 an RFID inlay is provided. RFID inlays are available under the trade names AD-222, AD-224 and Flexwing all available from Avery Dennison Corporation, Pasadena, Calif.

At step 120 the connective portions of the inlay assembly, the chip and that portion of the antenna, as well as any conductive leads used to connect the chip to the antenna are covered with a protective cap or material. The material used for the covering ideally should be flexible, so that as the inlay is flexed or bent, the material will not crack and will bend with and protect the connective elements. Suitable materials include rubber, plastics, foams and the like.

The RFID inlay is then positioned within the cavity at step 130. The step of positioning does not require the inlay to be physically attached to the housing, but rather the inlay can be freely floating within the housing or air space to allow fewer stresses to be impacted upon the inlay. In an alternative step 135, the inlay can be attached to the cavity wall such as through the use of adhesive. In addition the attachment can occur during the molding of the housing if the inlay is presented during the manufacture of the housing.

Finally, the housing can be sealed at step 140 to further protect the inlay and to mitigate the amount of stress that is imparted to the inlay during the use of the housing in a particular application.

It will thus be seen according to the present invention a highly advantageous RFID device and method of manufacturing has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

The invention claimed is:

1. An RFID device, comprising;
    a substrate having first and second surfaces;
    an intermediate structure, the intermediate structure including a chip and conductive leads;
    an antenna applied to the first surface of the substrate and the chip connected to the antenna via the conductive leads on the first surface of the substrate;
    a flexible protective cap applied substantially over the chip and only a portion of the antenna, the protective cap extending generally upwardly from the first surface of the substrate;
    and wherein the RFID device is used in a non-planar arrangement, and the substrate is a flexible polyethylene-based film or paper.

2. An RFID device as recited in claim 1, wherein the chip is connected to the antenna by conductive leads.

3. An RFID device as recited in claim 2, wherein the protective cap substantially covers the conductive leads.

4. An RFID device as recited in claim 1, wherein the protective cap is made of a flexible material.

5. An RFID device as recited in claim 4, wherein the protective material is selected from a group including polyurethane, polyethylene, and other plastic and rubber like materials.

6. An RFID device as recited in claim 1, wherein the portion of the antenna covered by the protective cap includes connection points between the chip and the antenna.

7. An RFID device as recited in claim 1, wherein the protective cap is permanently bonded to the chip.

8. An RFID device, comprising;
    a flexible housing, the flexible housing having an exterior portion and an interior portion, with the interior portion having a cavity having a first dimension;
    an RFID inlay disposed within the cavity and having a second dimension less than the first dimension, the RFID inlay including a substrate having first and second surfaces, an antenna provided on the first surface and a chip connected to the antenna on the first surface, and a flexible protective covering provided substantially over the chip and only a portion of the antenna, the flexible protective covering extending generally upward from the first surface of the substrate;
    the cavity having a space not occupied by the RFID inlay;
    and wherein the RFID device is used in a non-planar arrangement.

9. An RFID device as recited in claim 8, wherein the portion of the antenna covered by the protective covering includes a connection area between the chip and the antenna.

10. An RFID device as recited in claim 8, wherein the chip is connected to the antenna by conductive leads.

11. An RFID device as recited in claim 10, wherein the protective covering covers over the conductive leads.

12. An RFID device as recited in claim 8, wherein the protective covering is permanently bonded to the RFID inlay.

13. An RFID device as recited in claim 8, wherein protective covering is provided over less than a majority of the first surface of the substrate.

14. A method of making an RFID device, comprising the steps of;
    providing an RFID inlay, the RFID inlay including a substrate having first and second surfaces with an antenna applied to the first surface;
    providing an intermediate structure, the intermediate structure including a chip and conductive leads;
    attaching the conductive leads to the antenna;
    covering the chip and a portion of the antenna with a flexible protective cover, the flexible protective cover extending generally upward from the first surface of the substrate;
    and subjecting the RFID device to additional stresses in a non-planar arrangement.

15. A method as recited in claim 14, including a further step of preparing a housing having an exterior portion and an interior with the interior portion defining a cavity prior to the step of providing an RFID inlay.

16. A method as recited in claim 15, including a further step of positioning the RFID inlay within the cavity of the housing after the step of preparing a housing.

17. A method as recited in claim 16, including a further step of sealing the RFID inlay in the cavity in the housing after the step of covering the chip.

18. A method as recited in claim 16, including a further step of attaching the RFID inlay to the housing after the step of positioning.

19. A method as recited in claim 18, wherein the RFID inlay is attached along an end edge of the housing.

20. An RFID device as recited in claim 8, wherein the cavity includes an inert gas.

21. An RFID device as recited in claim 8, wherein the cavity is filled with a gel or liquid.

22. An RFID device as recited in claim 8, wherein the RFID inlay is free floating within the cavity.

23. An RFID device as recited in claim 8, wherein the RFID inlay is attached to an interior end edge of the housing.

* * * * *